United States Patent [19]

Berger et al.

[11] Patent Number: 5,293,853

[45] Date of Patent: Mar. 15, 1994

[54] SYSTEM FOR CONTROLLING AN INTERNAL COMBUSTION ENGINE

[75] Inventors: Joachim Berger, Winterback; Manfred Birk, Oberriexingen; Gerhard Engel, Stuttgart, all of Fed. Rep. of Germany

[73] Assignee: Robert Bosch GmbH, Stuttgart, Fed. Rep. of Germany

[21] Appl. No.: 16,914

[22] Filed: Feb. 12, 1993

[30] Foreign Application Priority Data

Mar. 13, 1992 [DE] Fed. Rep. of Germany ....... 4208002

[51] Int. Cl.⁵ .................... F02D 41/14; F02M 39/00
[52] U.S. Cl. ................................... 123/357; 123/673
[58] Field of Search ............... 123/357, 419, 436, 478, 123/480, 486, 673, 674, 679, 681, 687

[56] References Cited

U.S. PATENT DOCUMENTS

| | | | |
|---|---|---|---|
| 4,426,980 | 1/1984 | Eisele et al. | 123/478 |
| 4,572,130 | 2/1986 | Tsukamoto et al. | 123/357 |
| 4,653,447 | 3/1987 | Linder et al. | 123/357 |
| 4,667,633 | 5/1987 | Stumpp et al. | 123/357 |
| 4,718,390 | 1/1988 | Gonda et al. | 123/357 X |
| 4,934,328 | 6/1990 | Ishii et al. | 123/673 |
| 4,962,741 | 10/1990 | Cook et al. | 123/673 |
| 5,033,437 | 7/1991 | Hori et al. | 123/674 |
| 5,123,397 | 6/1992 | Richeson | 123/316 X |

FOREIGN PATENT DOCUMENTS 3011595 10/1981 Fed. Rep. of Germany .
3343481 6/1985 Fed. Rep. of Germany .

*Primary Examiner*—Willis R. Wolfe
*Attorney, Agent, or Firm*—Kenyon & Kenyon

[57] ABSTRACT

The invention relates to a system for controlling an internal combustion engine (100), in particular a self-igniting internal combustion engine. A signal (U) for triggering a performance-determining final controlling element (105) is stored in a characteristics map (110) for each of a corresponding fuel quantity (QK) to be injected into the engine. The signal values stored in the characteristics map (110) are then corrected in dependence upon a predetermined relationship of a signal corresponding to the value for the fuel quantity (QK) to be injected and a signal corresponding to the value for the actually injected fuel quantity (QKI).

10 Claims, 4 Drawing Sheets

SYSTEM FOR CONTROLLING AN INTERNAL COMBUSTION ENGINE

BACKGROUND OF THE INVENTION

The invention relates to a system for controlling an internal combustion engine, in particular, self-igniting internal combustion engine pursuant to the introductory part of the independent claim.

Such a system is disclosed by the German Published Patent Application 33 43 481. It describes a method and device for controlling a self-igniting internal combustion engine comprising a correcting means, which compensates for the correlation that changes over time between the quantity of fuel which is actually injected and the positional signal from the final quantity-determining controlling element.

This method provides for a signal-detecting sensor, which indicates the quantity of fuel actually injected. In the method described, this corresponds to a sensor for detecting the position of the control rod. Such a sensor supplies only a very inaccurate signal with respect to the injected fuel quantity For this reason, it is also tested in an overrun operation, to determine the point (triggering signal) at which no more fuel injection takes place. A needle-motion sensor is used to test for such injections.

The German Published Patent Application 30 11 595 discloses another method and another device for correcting manifestations of drift. With this method, the setpoint value for the quantity of fuel to be injected is corrected so as to allow the correlation between the positional signal of the final quantity-determining controlling element and the fuel quantity actually injected to conform. This document does not reveal how these correction values are determined.

These systems require the sensors to operate for a very long period of time and the sensors only supply very inaccurate values.

The object of the invention is to make it possible to use a simple and precise open-loop control for an internal combustion engine in a system for controlling that engine. More particularly, it is the aim of the invention to make available a very precise load signal for controlling additional variables, such as the exhaust-gas recirculation rate and/or the start of injection.

The system according to the invention results in a significantly more precise open-loop control for internal combustion engines. In particular, the exhaustgas emissions are able to be considerably reduced.

Advantageous and useful refinements and further developments of the invention are characterized in the dependent claims.

DETAILED DESCRIPTION OF THE PREFERRED EMBODIMENT

Figure 1:
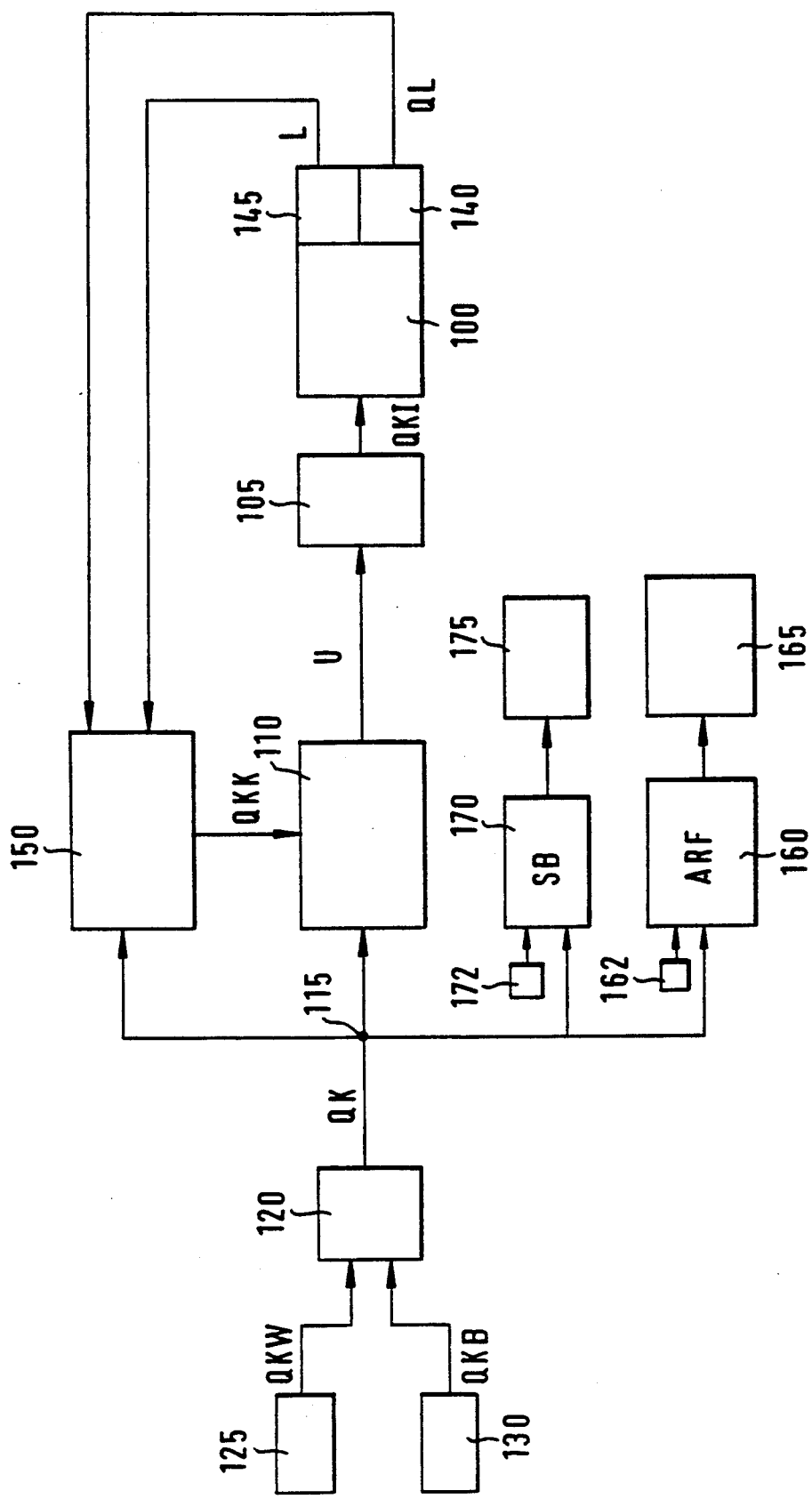
FIG. 1 illustrates a block diagram of the device according to the invention.

FIG. 1 shows a block diagram of the device according to the invention. An internal combustion engine 100 is shown, into which a specific fuel quantity QKI is metered in by a fuel pump 105. The fuel pump communicates with a pump characteristics map 110. This communicates, in turn, via a junction point 115 with a minimal selection unit 120. The minimal selection unit 120 receives a signal QKW from a setpoint selection unit 125, as well as a signal QKB from a limiting device 130.

Various sensors 140 and 145 are arranged on the internal combustion engine These sensors supply signals to a correcting device 150, which, in addition, receives the output signal QK from the minimal selection unit 120. The correcting device 150 applies a correcting value QKK to the pump characteristics map 110.

Furthermore, the output signal from the minimal selection unit QK is supplied to an exhaust-gas recirculation control stage 160, as well as, to a beginning-of-injection control stage 170. In addition, signals from sensors 162 are provided to the exhaust-gas recirculation control stage 160. The exhaust-gas recirculation applies signals to the exhaust-gas recirculation actuator 165.

The beginning-of-injection control stage 170 receives output signals from various sensors 172 and applies signals to a beginning-of-injection actuator 175.

The functioning of this device is as follows. The setpoint selection unit 125 specifies a fuel quantity value QKW. This is the quantity of fuel required to operate the internal combustion engine at a speed desired by the driver. For this purpose, the setpoint selection unit 125 contains at least one operating element, which serves to detect the driver's wish. Such means are, for example, a gas-pedal position transducer, or rather a cruise controller. In addition, the setpoint selection unit can include an idle-speed controller, or rather a speed controller.

In dependence upon the various operating parameters, the limiting device 130 calculates a highest permissible fuel quantity QKB. This highest permissible fuel quantity QKB is rated so as to ensure that the internal combustion engine does not become damaged, or rather so that exhaust-gas emissions do not exceed certain values.

The minimal selection unit 120 selects the smaller of the signals QKW or QKB. In this manner, the desired fuel quantity QKW is limited to the highest permissible fuel quantity QKB. The value for the fuel quantities QK to be injected is now applied to the output of the minimal selection unit 120.

Filed in the pump characteristics map 110, in dependence upon the value for the fuel quantity QK to be injected, is a signal U which is applied to the fuel pump, or rather to a regulating unit of the fuel pump, 105. As a result, the fuel pump 105 meters the actual fuel quantity QKI into the internal combustion engine 100.

The signal pertaining to the value for the fuel quantity QK to be injected is supplied at the junction point 115 to further devices. Thus, the exhaust-gas recirculation control stage 160 transmits a triggering signal to the exhaust-gas recirculation controlling unit 165 in dependence upon the value of the fuel quantity QK to be injected and the output signal from other sensors 162. To realize a combustion which is as free as possible of exhaust gas and emissions, the exhaust-gas recirculation rate must be selected in dependence upon the quantity of fuel that is actually injected.

If the calculation is made on the basis of an inaccurate fuel-quantity value, then an erroneous exhaust-gas recirculation rate results and, consequently, considerable exhaust-gas emissions can possibly occur. This occurs, in particular, in the case of small fuel quantities to be injected. In this case, the percentage error is the highest. If there is a cumulative deviation between the value for the fuel quantity to be injected and the fuel quantity that is actually injected, then the relative error is the greatest in the case of small injection quantities. Thus, the effect on the exhaust-gas emission is also the greatest in the case of small fuel quantities.

Furthermore, the value for the fuel quantity QK to be injected, is provided to the beginning-of-injection control stage 170. This beginning-of-injection control stage 170 transmits a triggering signal to the beginning-of-injection actuator 175 in dependence upon additional sensors 172. Here, as well, it is important that a very precise signal pertaining to the injected fuel quantity be supplied to the beginning-of-injection control stage.

In known systems, one is confronted with the problem that the value QK (the fuel quantity to be injected) is an inaccurate measure of the fuel quantity that is actually injected. This is because, first of all, given the same triggering signal, not all devices are calibrated to provide the same amount of fuel, due to the component tolerances in the manufacturing of the fuel pumps. Furthermore, it turns out that the correlation between the signal QK, with respect to the fuel quantity to be injected and the fuel quantity that is actually injected, can change considerably over the course of the operating time.

To obtain the most exact possible correlation between the value of the fuel quantity QK to be injected and the value for the fuel quantity QKI which is actually injected, it is proposed to correct the pump characteristics map 110, in which the correlation between the value for the fuel quantity QK to be injected and the control signal U for the fuel pump 105 is filed, so as to allow a known, defined relationship to exist between the two signals. This relationship is constant for all fuel pumps of one series and over the entire operating time of one fuel pump.

The sensors 145 and 140 detect various operating parameters and conduct corresponding signals to the correcting device 150. On the basis of the sensor signals and the value for the fuel quantity QK to be injected, this correcting device 150 calculates the correction value QKK which is used to correct the pump characteristics map.

The pump characteristics map 110 is corrected so as to allow the signal pertaining to the value for the fuel quantity QK to be injected, to conform to the injected fuel quantity QKI. The procedure, i.e., how the correction values QKK are determined in the correcting device 150, is described in the following Figures.

Figure 2A:
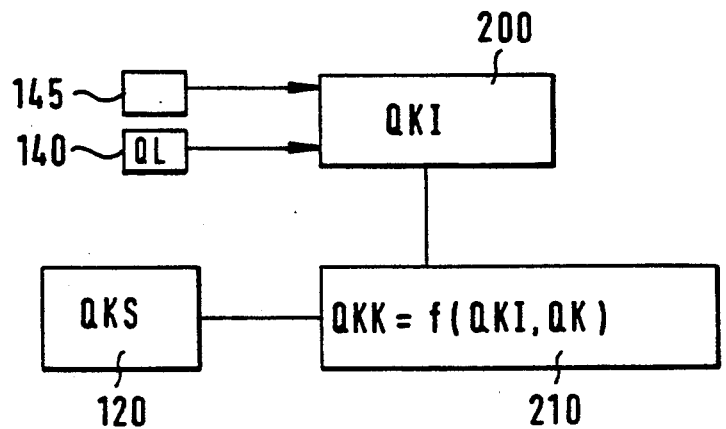
FIGS. 2a and 2b illustrate systems that use the output signal from a lambda probe.

In the case of the method depicted in FIG. 2a, first of all, a sensor 140 is provided, which acquires the intake-air quantity QL. Also provided is a lambda probe 145, which supplies a signal that specifies the air ratio $\lambda$. The lambda probe 145 supplies a signal which depends directly on the oxygen concentration in the exhaust gas. Preferably, a linear relation exists between the oxygen concentration and the output signal from the lambda probe. The signal pertaining to the oxygen concentration is then able to be converted into the air ratio $\lambda$. These sensors communicate with a quantity-calculation unit 200. The output quantity from the quantity-calculation unit 200 arrives at a correction-value calculation unit 210. In addition, the value QK is supplied to this correction-value calculation unit 210 by the minimal selection unit 120.

If the intake-air quantity is known from the measurement made by the sensor 140, then the injected fuel quantity QKI results in accordance with the following formula $$QKI = QL/14.5 * \lambda$$

The thus calculated actual injected fuel quantity QKI is then compared in the correction-value calculation unit 210 to the value QK. The deviation between the two values corresponds to the existing quantity error. On the basis of this difference, the correction value QKK is derived, such value being used to correct the pump characteristics map.

In the case of a preferred refinement, the new correction values determined in one characteristics-map area are weighted with previously determined correction values. This makes it possible to improve the reliability of the method.

After the pump characteristics map 110 has been corrected in this manner, the value for the fuel quantity QK to be injected corresponds to the actually injected fuel quantity QKI. Thus, having the value for the fuel quantity QK means that a very accurate load signal is available.

The disadvantage of this method is that it requires an expensive air-quantity sensor.

Figure 2B:
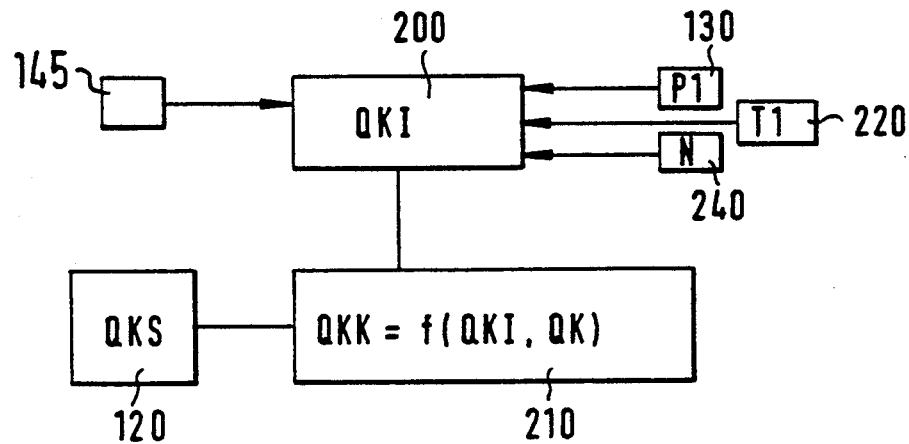

In the refinement according to FIG. 2b, one is able to dispense with the cost-intensive air-quantity sensor 140. In the case of the method described here, the lambda probe 145, which supplies a signal specifying the air ratio $\lambda$, is likewise used. The lambda probe communicates with the quantity-calculation unit 200. Furthermore, signals from a temperature sensor 220, a pressure sensor 230 and, when necessary, from a speed sensor 240 are provided to the quantity-calculation unit. The output quantity from the quantity-calculation unit 200 is provided to the correction-value calculation unit 210. Furthermore, the value for the fuel quantity QK to be injected is supplied to this correction-value calculation unit 210 from the minimal selection unit 120.

T1 and P1 are measured in the operating states, in which the intake volume per stroke is defined. Such an excellent operating state is at hand, for example, when the supercharger does not deliver any increase in pressure and when the engine exhibits the characteristics of a naturally aspirated engine. This is particularly the case when there are small loads. The supercharger is not active when there are small loads and small quantities of fuel to be injected.

The air mass per stroke is then calculated on the basis of the known air volume per stroke, the temperature T1, and the pressure P1. In this case, the exhaust-gas recirculation must be stopped, or rather the process is only carried out in the operating states in which no exhaust-gas recirculation takes place. In place of T1, another temperature T2 can also be acquired as a substitute. T1 represents the air temperature, and P1 the air pressure upstream from the compressor.

The intake-air mass results as a function of P1, T1, the rotational frequency, and the value for the fuel quantity QK to be injected. From the thus calculated air mass and the air ratio, the fuel quantity QKI actually injected is then produced by the formula already indicated above.

The thus calculated, actually injected fuel quantity QKI is then compared in the correction-value calculation unit 210 to the value QK. The difference between the two values corresponds to the existing quantitative error. On the basis of this difference, one then obtains the correction value QKK used to correct the pump characteristics map.

In one refinement, the pressure sensor can also be dispensed with. This is achieved in the operating states which entail an exactly controlled fuel quantity. Such an operating state is, for example, the reference point of the fuel pump 105. The procedure is as follows. On the basis of the value for the fuel quantity QK to be injected and the air ratio λ measured by the lambda sensor 145, the required air quantity QL is obtained according to the formula:

$$QL = 14.5 * \lambda * QK$$

The difference between this calculated air quantity and a typical, average value of the air quantity at, for example, 300 m sea level, is a measure for the actual altitude above sea level.

The reference point is that fuel-quantity value, to which the fuel pump is adjusted, when it is installed on the internal combustion engine. This value usually lies within the full-load range. Here as well, no corruption is caused by an exhaust-gas recirculation, since this recirculation is not active in this range.

When the internal combustion engine is at that working point, which is characterized by an exactly controlled fuel quantity and by the typical air quantity QL(300 m), and when the motor vehicle is situated at an altitude of 300 meters above sea level, the difference DQL=QL−QL(300 m) is formulated on the basis of the required air quantity QL. Based on this difference DQL, one obtains a correction factor K, which is used to correct the characteristics map that has been filed for the air quantity QL in other working points. This correction preferably is made in accordance with the formula:

$$QLK = K * QL(N,QK)_{300}$$

In this case, $QL(N,QK)_{300}$ is the air quantity required at an altitude of 300 meters above sea level at a working point defined by the rotational frequency N and the fuel quantity QK to be injected.

This correction makes it possible for one to obtain an air mass, which has been corrected for altitude, in those working points relevant to the exhaust-gas recirculation. An altitude sensor for acquiring ambient pressure is not needed thereby.

As already clarified, the actually injected fuel quantity QKI, as well as the correction values QKK, are now calculated in working points characterized by a well-defined intake air volume.

The pump characteristics map 110 is then corrected, cumulatively and/or multiplicatively, on the basis of the quantitative error QKK. The multiplicative correction is selected so as to ensure that no quantitative correction is made in the reference point of the injection pump, since the pump tolerances are small in this case, due to the precisely adjusted condition. As a rule, the reference point lies in the full-load range. In the case of small fuel quantities, a multiplicative constant is specified on the basis of the correction fuel quantity QKK.

When the fuel quantities are small, significant corrections are made. Here, however, the process error is the smallest, because the correction fuel quantity QKK is determined within the range of small fuel quantities In this range of small process errors, a faulty load signal has the strongest effect on an exhaust-gas recirculation control. Therefore, the correction values are determined in those operating states, in which the errors and their effect on the exhaust-gas emissions are the greatest.

Another possibility for correcting the pump characteristics map 110 is based on the following realization. If the injected fuel quantity is reduced in no-load operation for one cylinder, then this results in a decreased torque and, thus, in a smaller rotational frequency. The idle-speed controller compensates for this smaller rotational frequency by increasing the setpoint quantity. For this idle-speed controller, the corruption at the one cylinder is a disturbance. If the value for the fuel quantity to be injected is further reduced at this one cylinder, then the compensation operation carried out by the idle-speed controller stops when the zero quantity is reached. Therefore, this method makes it possible to recognize the value at which the injected fuel quantity becomes zero. This results in the so-called zero-quantity characteristic.

On the other hand, if the value for the fuel quantity QK to be injected is increased at one cylinder and lowered at another cylinder by the same amount, then the engine torque remains constant and the idle-speed controller does not show any reaction. If the change amount is continuously increased, then the idle-speed controller intervenes when the zero quantity is reached at the cylinder having a reduced fuel quantity. At this instant, an increase in the engine torque results. The instant of controller intervention corresponds to the attainment of the zero characteristic.

Figure 3:
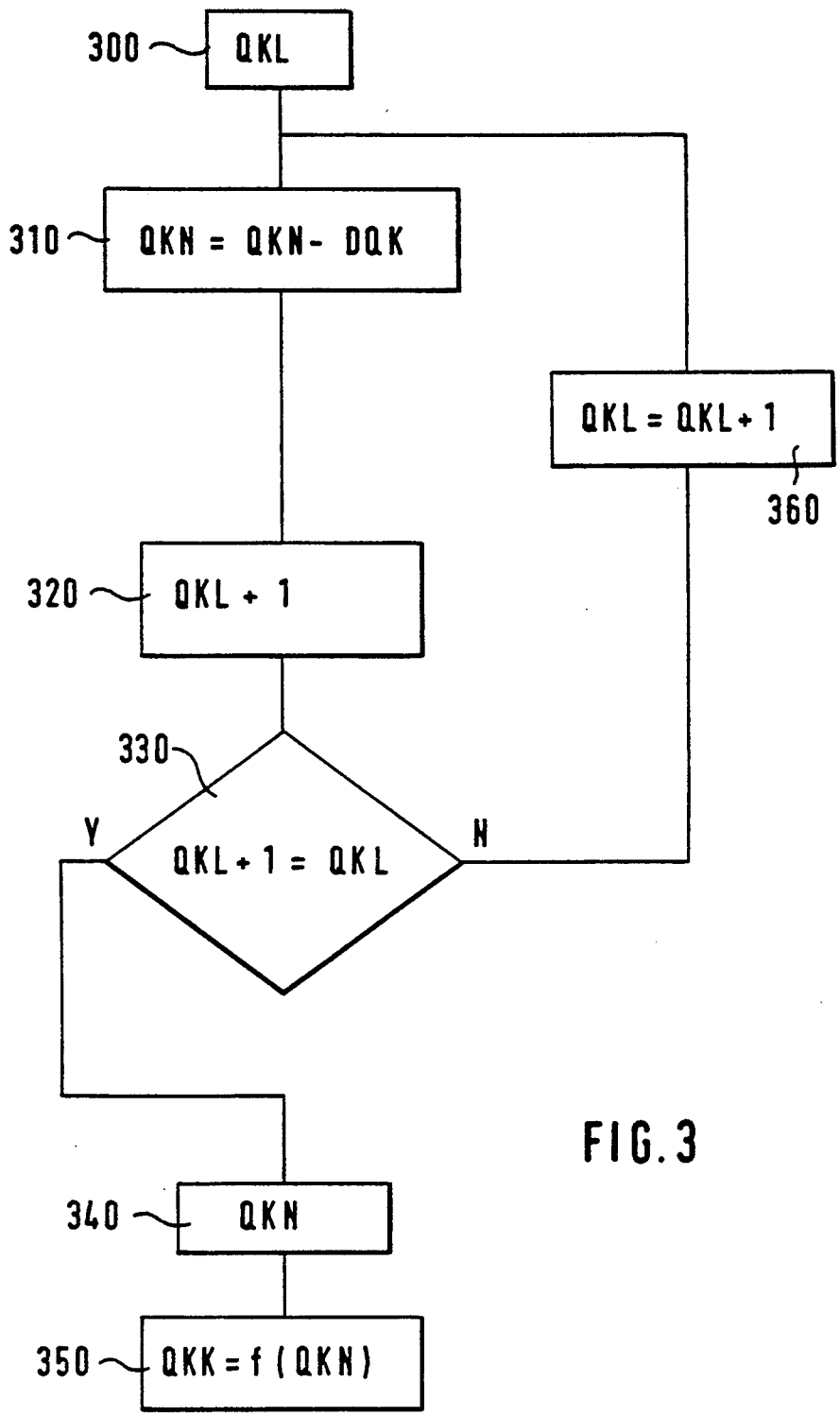
FIGS. 3 and 4 show flow diagrams for evaluating the manipulated variable of a speed controller.

A possible procedure is shown in FIG. 3. The output signal QKL from the idle-speed controller is detected in a first step 300. Since the idle-speed controller is usually integrated in the setpoint selection unit 125, only the fuel quantity QK to be injected has to be evaluated. In step 310, the value of the fuel quantity QKN to be injected is reduced for the cylinder by a specific amount DQK. The now resulting output quantity QKL+1 from the idle-speed controller is detected in step 320. The new and the old value of the idle-speed controller are compared in step 330. If the two values are the same, then a pair of values for the zero-quantity characteristic results in step 340. This is the value at which the injected fuel quantity for cylinder N becomes zero.

On the basis of this variable, the correction quantity QKK is then calculated in step 350. If it turns out that the two values of the idle-speed controller are unequal in the interrogation unit 330, then the old value QKL is replaced by the new value QKL+1 in step 360. The process continues subsequently with step 310.

Figure 4:
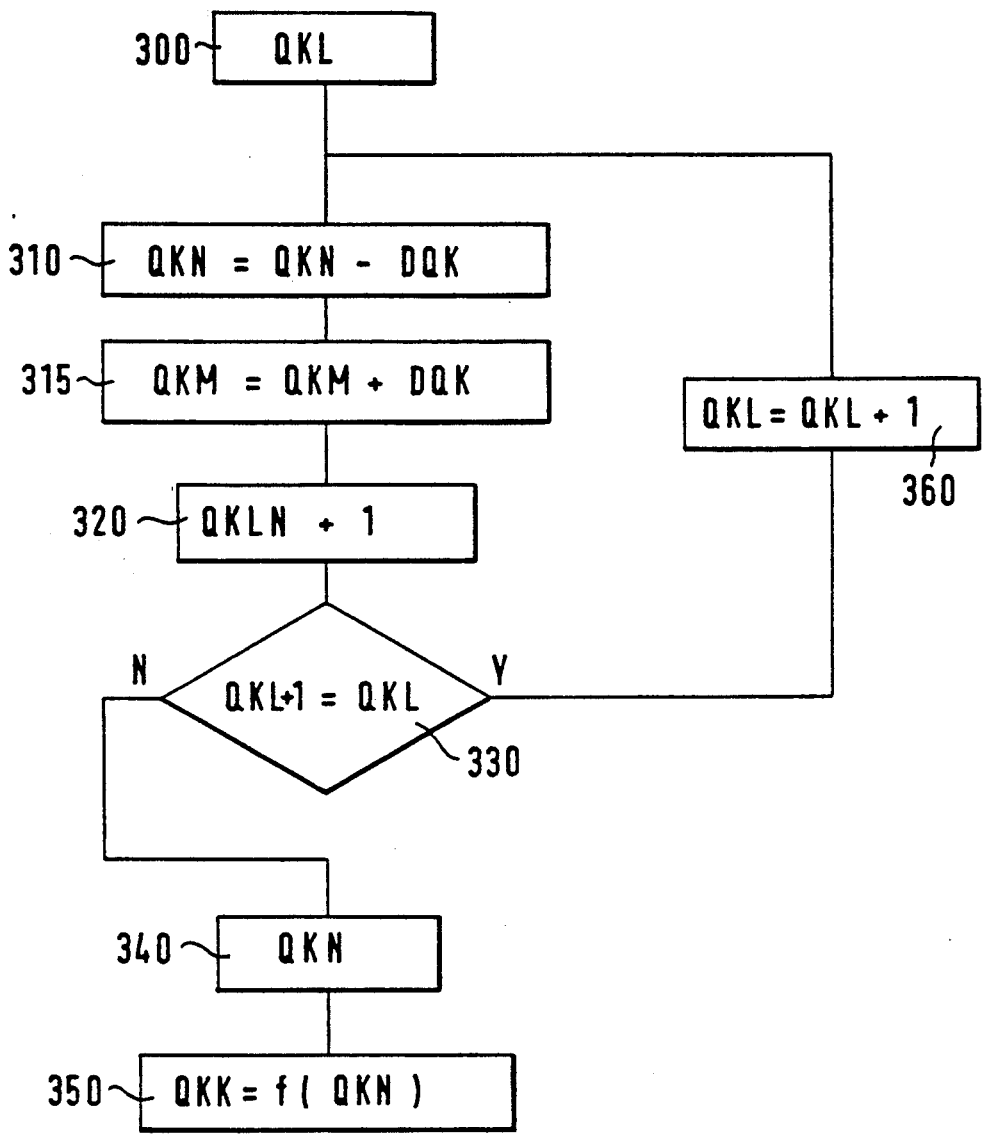

The process, in which the fuel quantity to be injected is increased at one cylinder and reduced at another cylinder, is described in FIG. 4. Blocks corresponding to those in FIG. 3 are designated by the same reference numerals An important difference here is that after the fuel quantity to be injected is reduced in block 310 for one cylinder, the fuel quantity to be injected is increased in step 315 for another cylinder. Furthermore, the zero characteristic is recognized in step 330, when the output signal from the idle-speed controller changes.

These procedures determine at precisely which value of QK (the fuel quantity to be injected), no more injections follow. The characteristics map 110 must now be adjusted, so that when the injected fuel quantity QKI becomes zero, the value for the fuel quantity QK to be injected will also become zero.

These procedures are not limited to being carried out only in no-load operation. If a speed controller is present, which can keep the rotational frequency of the internal combustion engine to a specified rotational frequency, then the processes can be carried out at any desired rotational frequency. In this case, the output signal from the speed controller is monitored in place of the idle-speed controller to check if a change has occurred. This takes place preferably at a service station or at the end of the assembly line before delivery of the motor vehicle.

To ensure to the greatest extent possible that the adjusting operation is not noticed by the driver and that ample adjusting times are available for making quantity adjustments, the adjusting operation preferably takes place in no-load operation. If the fuel quantity is lowered at one cylinder and increased at the remaining cylinders by a corresponding amount, then the method only leads to slight disturbances in the speed characteristic curve. In particular, the fuel quantity is increased for those cylinders, which lie in the firing order before and after the cylinder whose fuel quantity had been reduced.

The method is preferably only carried out in longer time intervals, for example after a specific mileage of approx. 1000 kilometers.

If the method is applied at the end of the results that the correction can be determined at any rotational frequencies whatsoever. Furthermore, highly precise measuring instruments, which normally cannot be used during a driving operation, can be used at the end of the assembly line or at a service station. As a result, very exact correction values are obtained.

What is claimed is:

1. A system for controlling an internal combustion engine, in particular a self-igniting internal combustion engine, comprising:
   a performance-determining controlling element;
   means for generating signals (U) for triggering the performance-determining controlling element;
   a characteristic map for storing a value of a signal (U) for each of a corresponding fuel quantity (QK) to be injected into the engine, the stored values of the signal (U) being corrected based on a predetermined relationship between a value for the fuel quantity (QK) to be injected and a value for an actually injected fuel quantity (QKI); and
   a first sensor adapted to measure a first engine parameter, the parameter corresponding to an air ratio lambda value ($\lambda$), with the actual injected fuel quantity (QKI) being determined as a function of an intake-air quantity (QL) and the air ratio lambda value ($\lambda$).

2. The system of claim 1, wherein the first engine parameter is an oxygen concentration of an exhaust gas.

3. The system of claim 2, wherein the system further comprises a second sensor to measure the intake-air quantity (QL).

4. The system of claim 3, wherein the intake-air quantity (QL) is specified on the basis of at least a temperature value (T1) and a pressure value (P1).

5. The system of claim 3, wherein the intake air quality (QL) is determined based on a predetermined relationship between a known fuel quantity (QK) to be injected and a measured air ratio lambda value ($\lambda$).

6. The system of claim 1, wherein the system further comprises a speed controller coupled to the characteristics map, the speed controller being adaptable to output a speed signal being used to determine a value of the fuel quantity (QK) to be injected at which an injected fuel quantity (QKI) becomes zero for a particular cylinder.

7. The system of claim 6, wherein the system is adaptable to reduce a fuel quantity (QKN) to be injected for a particular cylinder down to the zero quantity in a fixed rotational frequency operating state, in particular, a no-load operating state, with the system being further adaptable to determine, based on the speed signal, a value for the fuel quantity (QK) to be injected at which injection into a particular cylinder ceases.

8. The system of claim 7, wherein the system is adaptable to increase the fuel quantity (QKN) to be injected for at least another particular cylinder by a corresponding amount after the system has reduced the fuel quantity (QKN) to be injected for a particular cylinder.

9. The system of claim 1, wherein the stored values of the signal (U) in the characteristics map are corrected according to an averaging of the stored values of the signal (U) with at least a previous corresponding stored value of the signal (U).

10. The system of claim 1, wherein the stored values of the signal (U) in the characteristics map are corrected according to a weighted averaging of the stored values of the signal (U) with at least a previous corresponding stored value of the signal (U).

* * * * *

UNITED STATES PATENT AND TRADEMARK OFFICE
CERTIFICATE OF CORRECTION

PATENT NO. : 5,293,853
DATED : March 15, 1994
INVENTOR(S) : Berger, et al.

It is certified that error appears in the above-indentified patent and that said Letters Patent is hereby corrected as shown below:

Column 1, line 7, change "self-igniting" to

-- a self-igniting --;

Column 7, line 28, change "the results" to

-- the assembly line or at a service station, the advantage results --.

Signed and Sealed this

First Day of November, 1994

Attest:

BRUCE LEHMAN

Attesting Officer     Commissioner of Patents and Trademarks